United States Patent [19]

Alpher

[11] Patent Number: 5,552,805
[45] Date of Patent: Sep. 3, 1996

[54] METHOD AND SYSTEM FOR DISPLAYING BLENDED COLORS

[75] Inventor: Aaron M. Alpher, Ashburn, Va.

[73] Assignee: Praxisoft, Inc., Ashburn, Va.

[21] Appl. No.: 347,230

[22] Filed: Nov. 25, 1994

[51] Int. Cl.$^6$ .................................................. G09G 5/02
[52] U.S. Cl. ........................ 345/153; 345/146; 395/155
[58] Field of Search ........................... 345/146, 150, 345/153; 395/131, 155, 156

[56] References Cited

U.S. PATENT DOCUMENTS

| | | |
|---|---|---|
| 4,524,421 | 6/1985 | Searby et al. . |
| 4,694,286 | 9/1987 | Bergstedt ............................. 345/146 |
| 4,695,832 | 9/1987 | Jacobson . |
| 4,799,053 | 1/1989 | Van Aken et al. . |
| 4,804,948 | 2/1989 | Nishi et al. . |
| 4,991,122 | 2/1991 | Sanders . |
| 5,047,842 | 9/1991 | Bouman, Jr. et al. . |
| 5,140,315 | 8/1992 | Edelson et al. . |
| 5,142,273 | 8/1992 | Wobermin . |
| 5,233,684 | 8/1993 | Ulichney . |
| 5,254,978 | 10/1993 | Beretta . |
| 5,258,829 | 11/1993 | Matsunaga et al. . |
| 5,311,212 | 5/1994 | Beretta ...................................... 345/150 |
| 5,343,311 | 8/1994 | Morag et al. . |

*Primary Examiner*—Jeffery Brier
*Attorney, Agent, or Firm*—Jeffrey D. Carter

[57] ABSTRACT

A method for displaying blended colors on a variable visual display is performed within a system by selecting two or more base colors to be blended, displaying the base colors at edge portions of a geometic display region having a shape based on the number of colors being blended, choosing a given number of intermediate colors to be generated in the blend, and generating the intermediate colors based on the relative distance from each intermediate color to each base color and a biasing factor which allows a user to increase the range of potential shades for a selected intermediate color given the same base colors. The resulting blend is displayed within the geometric display region on the variable visual display for a user who is then able to alter the blend in real-time, and/or isolate and store shade(s) of intermediate color(s) for future use.

26 Claims, 5 Drawing Sheets

METHOD AND SYSTEM FOR DISPLAYING BLENDED COLORS

FIELD OF THE INVENTION

The present invention relates to a method and system for displaying blended colors, and more particularly to a method and system for selecting two or more base colors and blending the selected base colors, according to a biasing factor, to display within a geometric display region a given number of intermediate colors between the respective base colors.

BACKGROUND OF THE INVENTION

The advent of modern computer systems has been greatly beneficial to the graphic art and desktop publishing industries. Through the use of computer technology, graphic artists, illustrators and plain "hackers" alike are now able to easily create designs, figures and symbols that once would have been considered impossible. One area that remains to be developed, however, is that of color selection and blending. Currently, most computer systems employ a rather simplistic method for choosing and blending colors. With such systems, there is typically either a certain palette of colors from which to choose from, or a very basic method for selecting and altering colors. Some of the more advanced graphics applications allow a user to draw two shapes on the screen, wherein each shape is assigned a different color. These shapes can then be "melded" together to produce a color blend. Unfortunately, it is very difficult to isolate one of the intermediate colors for later use. Manual methods for calculating blends, on the other hand, are very laborious and require much knowledge of geometry and mathematics, therefore making them undesirable.

SUMMARY OF THE INVENTION

Accordingly, it is an object of the present invention to provide an improved method and system for displaying blended colors in a computer environment.

It is another object to provide a color blend which is optimally displayed to a user within a geometric shape having a relative coordinate reference frame based on the number of colors being blended.

It is still another object to provide a color blend which can be altered in real-time to increase or decrease the potential shades of a selected intermediate color given the same base colors.

It is yet another object to provide a color blend wherein an intermediate color can be isolated for later use.

These and other objects may be achieved according to the principles of the present invention with a method and system for displaying blended colors by selecting two or more base colors to be blended, displaying the base colors at edge portions of a geometric region having a shape based on the number of colors being blended, determining a given number of intermediate colors to be generated in the blend, and generating the intermediate colors based on the relative distance from each intermediate color to each base color and a biasing factor which allows a user to increase the range of potential shades for a selected intermediate color given the same base colors. The resulting blend is displayed on a visual display terminal for a user who is then able to alter the blend in real-time.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
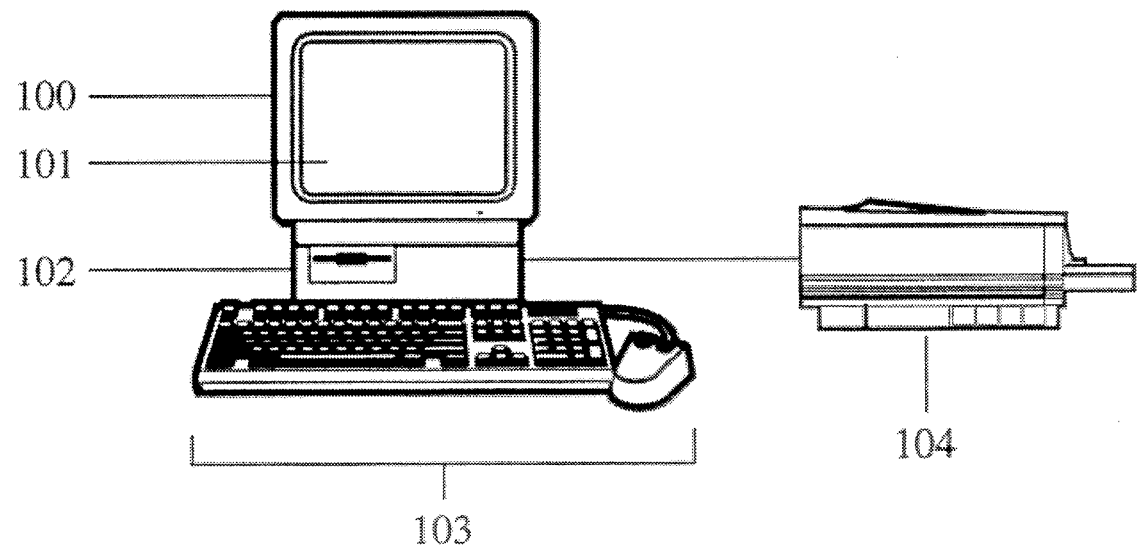
FIG. 1A illustrates a schematic block diagram of a computer system suitable for implementing the present invention.
Figure 1B:
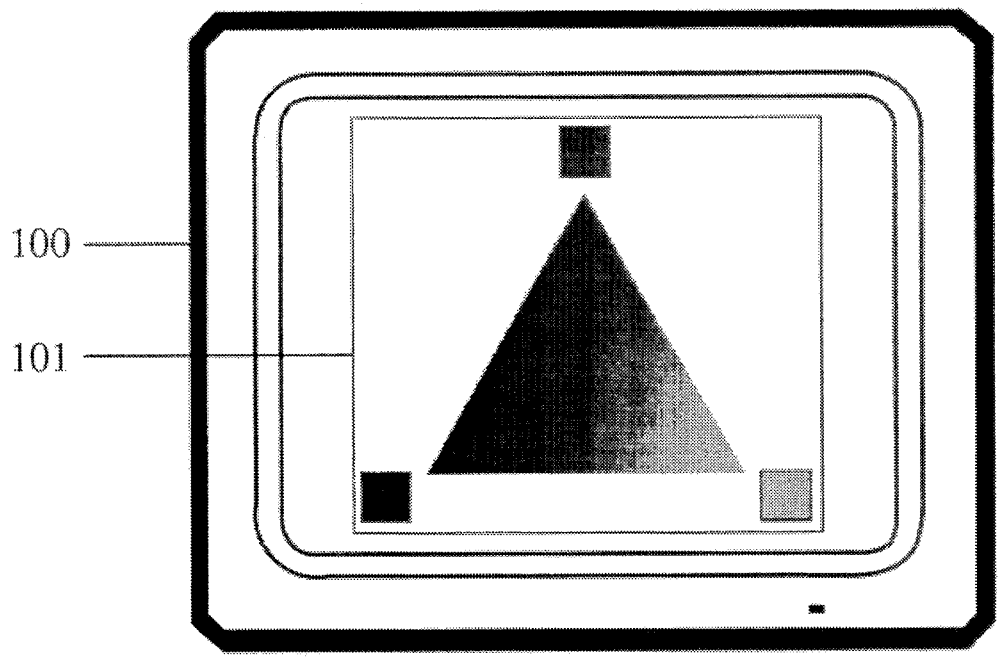
FIG. 1B illustrates the display region of FIG. 1A when a three color blend is being performed according to the principles of the present invention.

FIG. 1A illustrates a general computer system through which the present invention can be implemented. A variable visual display terminal 100 having display region 101 receives electrical signals from processing unit 102 in accordance with inputs from input terminals 103 (typically, a keyboard, mouse, roller ball, or the like). Processing unit 102 is responsible for executing the steps of the present invention in dependence upon entries from input terminals 103. Visual displays illustrated in display region 101 can be printed using a printer 104 capable of printing upon a printable medium such as paper, whether in color, greyscale or black-and-white. FIG. 1B illustrates display region 101 of FIG. 1A when a three color blend is being performed according to the principles of the present invention.

Figure 2:
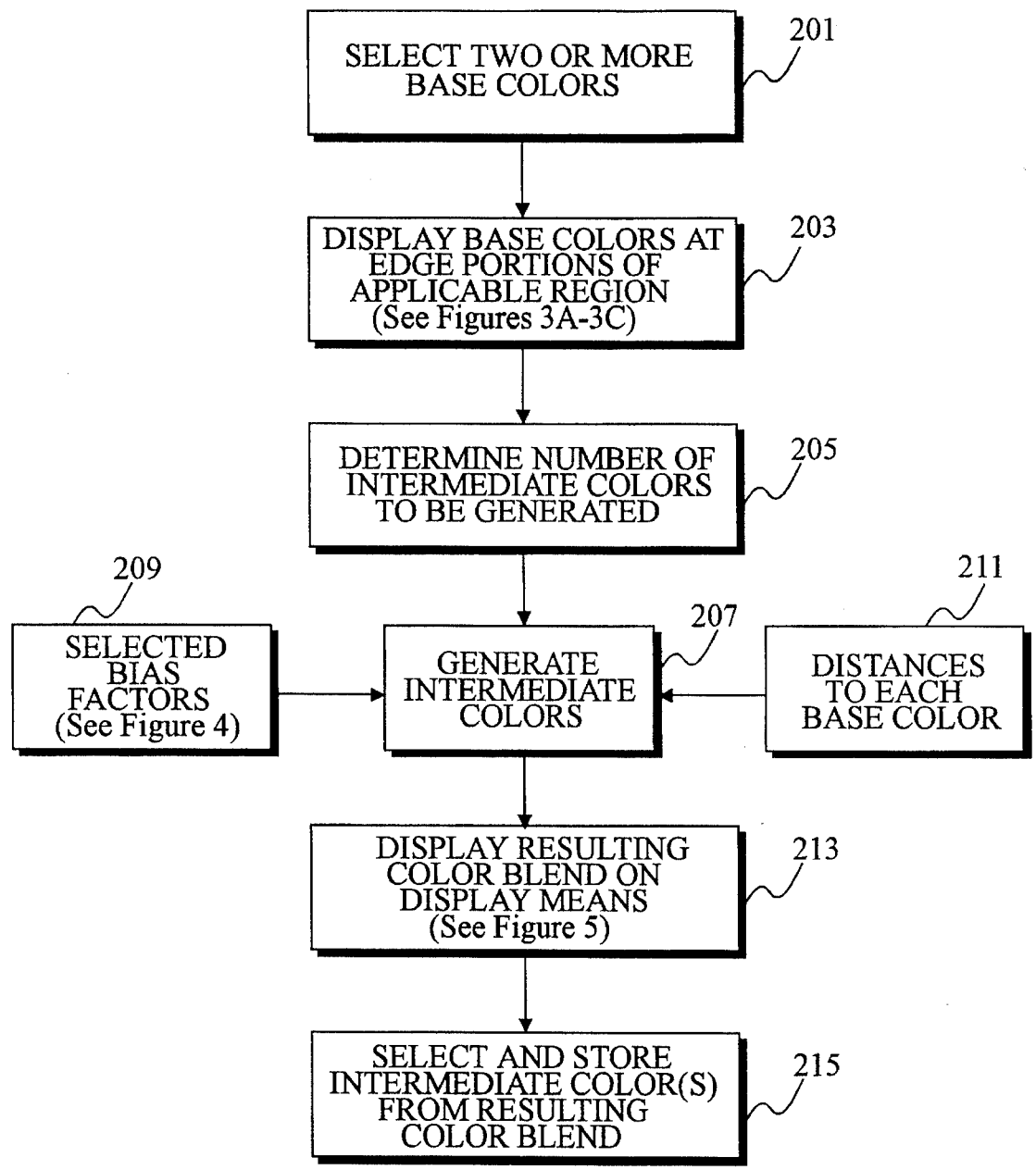
FIG. 2 illustrates the general steps of the color blending display method performed according to the principles of the present invention.

Referring to FIG. 2, a general outline of the steps of the present invention are illustrated. The method for displaying blended colors on a variable visual display according to the principles of the present invention include the steps of: selecting two or more base colors to be blended in step 201, displaying the base colors at edge portions of a geometric display region displayed on the variable visual display in step 203 wherein the geometric display region has a shape determined in dependence upon the number of base colors being blended, determining the number of intermediate colors to be generated in dependence upon an area of the geometric display region in step 205, generating the intermediate colors in step 207 in dependence upon relative contributions from each of the base colors (where the relative contributions include bias factors (step 209) and relative distances to each base color (step 211)), displaying a resulting color blend within the geometric display region on the variable visual display (typically, a computer monitor in step 213, and selecting and storing one or more of the intermediate colors in the resulting color blend for future use, if desired, in step 215). This method is able to blend randomly generated colors from any color space, as well as spot colors such "PANTONE" colors ("PANTONE" is a registered trademark of the Pantone Corporation).

In the above stated method, a user first selects the base colors to be blended in step 201. These base colors, which can be any color chosen by the user, including random colors or spot colors such as "PANTONE" colors, are selected through input means, such as a keyboard or mouse. Upon selection, the selected base colors are displayed at edge portions of a geometric display region on the variable visual display in step 203. The geometric display region has a shape determined on the basis of how many base colors are selected. This method of display is particularly advantageous since it allows viewers to observe the color blend with optimal visual perception.

Figure 3A:
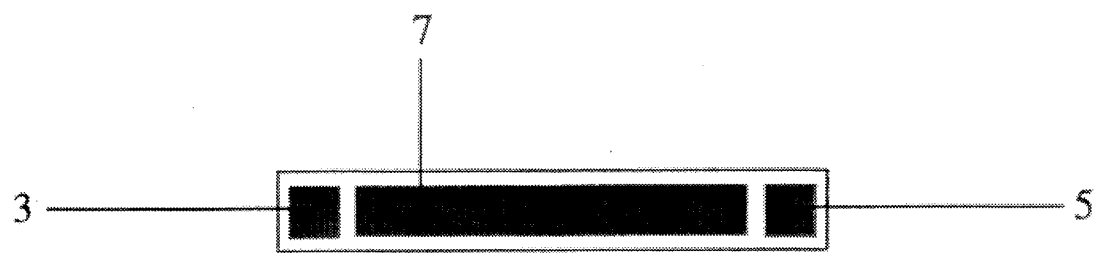
FIGS. 3A through 3C illustrate the geometric display regions used to display blends of two, three and four colors, respectively.
Figure 3B:
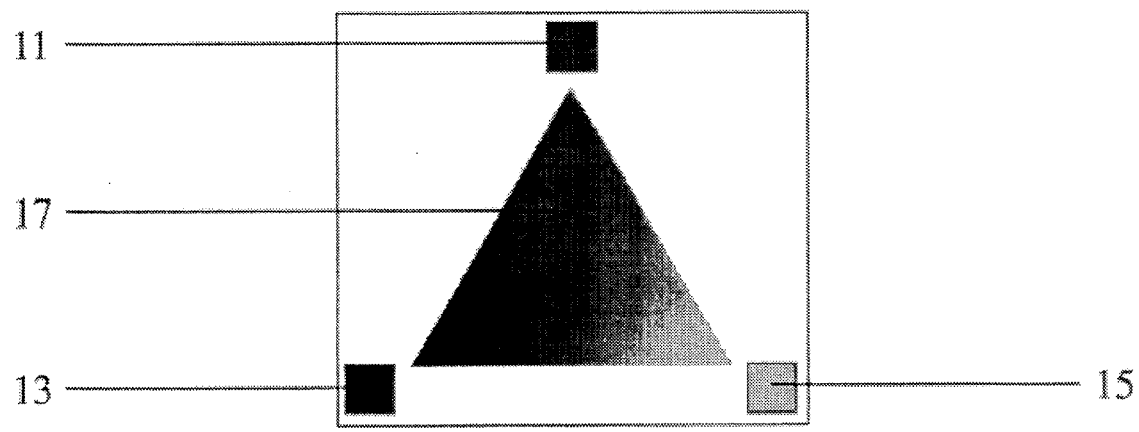
Figure 3C:
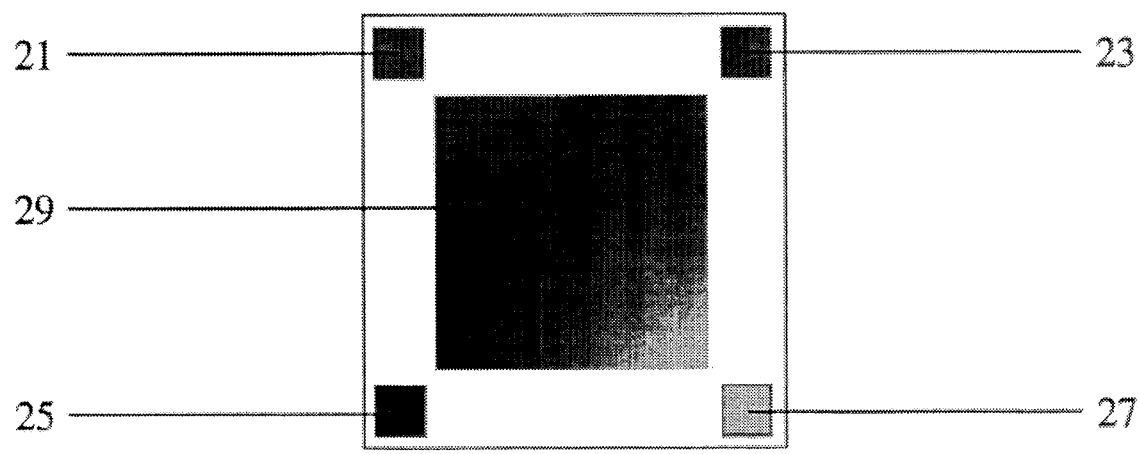

Referring to FIGS. 3A through 3C, the geometric display regions used to display two, three and four color blends are respectively illustrated. In FIG. 3A, the geometric display region used for a two color blend is shown as a rectangular bar having two edge portions 3 and 5 positioned on right and left outer sides. A resulting blend of the two selected base colors is displayed within bar-shaped display region 7. In FIG. 3B, the geometric display region used for a three color blend is shown as an equilateral triangle having three edge portions 11, 13 and 15 positioned at respective corners. A resulting blend of the three selected base colors is displayed within triangular display region 17. In FIG. 3C, the geometric display region for a four color blend is shown as a square having edge portions 21, 23, 25 and 27 positioned at respective corners. A resulting blend of the four selected base colors is displayed within square display region 29. While geometric display regions for only two, three and four color blends have been described above, the method can be similarly applied to color blends of five or more colors (i.e. a pentagonal shaped display region for a five color blend, a hexagonal shaped display region for a six color blend, an octagonal shaped display region for an eight color blend, etc.).

Returning again to FIG. 2, after the base colors to be blended have been selected and displayed at edge portions of the applicable geometric display region, the number of intermediate colors (i.e. color shades existing between the respective base colors) to be generated within the color blend is determined in step 205. This number is based on a predetermined relative coordinate reference frame that is proportional to the geometric display region in which the resulting color blend will be displayed. That is, the number is based on the area of the relevant geometric display region. For programming purposes, sizing of the region is a balance between computational speed, memory requirements and the ability of the human eye to discriminate between intermediate colors. If the display region is too small, the resulting blend will not show sufficient, discernible variation between colors, despite the low memory requirements and high computational speed. The opposite is true of a display region that is too large.

After the area of the applicable geometric display region is determined, the relative coordinate reference frame is set on the basis of the region and a pixel unit of measurement. The coordinates of each base color to be blended are then set within the reference frame. As stated above, the base colors are displayed at edge portions of the geometric display region. The number of intermediate colors required to completely fill the blend region is then determined on the basis of relative distances between the selected base colors. This number is equal to an area of the geometric display region (in pixels) minus the number of base colors to be blended for the three and four colors blends, and a proportional fraction (based on the height of the geometric display region in pixels) of the area minus the number of base colors to be blended for the two color blend. The number of intermediate colors to be generated within the color blend is selected as a small, proportional fraction (i.e. $1/16$th has been used in our preferred embodiment, although other similar fractions will also work well) of the number of intermediate colors required to fill the geometric display region. This is done to reduce memory requirements and to increase the speed of the blend's display.

Once the number of intermediate colors to be generated is set, each of these intermediate colors is generated in step 207 by determining relative contributions from each of the respective base colors. These relative contributions are determined on the basis of: 1) a selected bias factor from each one of the base colors in step 209; and 2) relative distances from each intermediate color to each one of the respective base colors in step 211.

Figure 4:
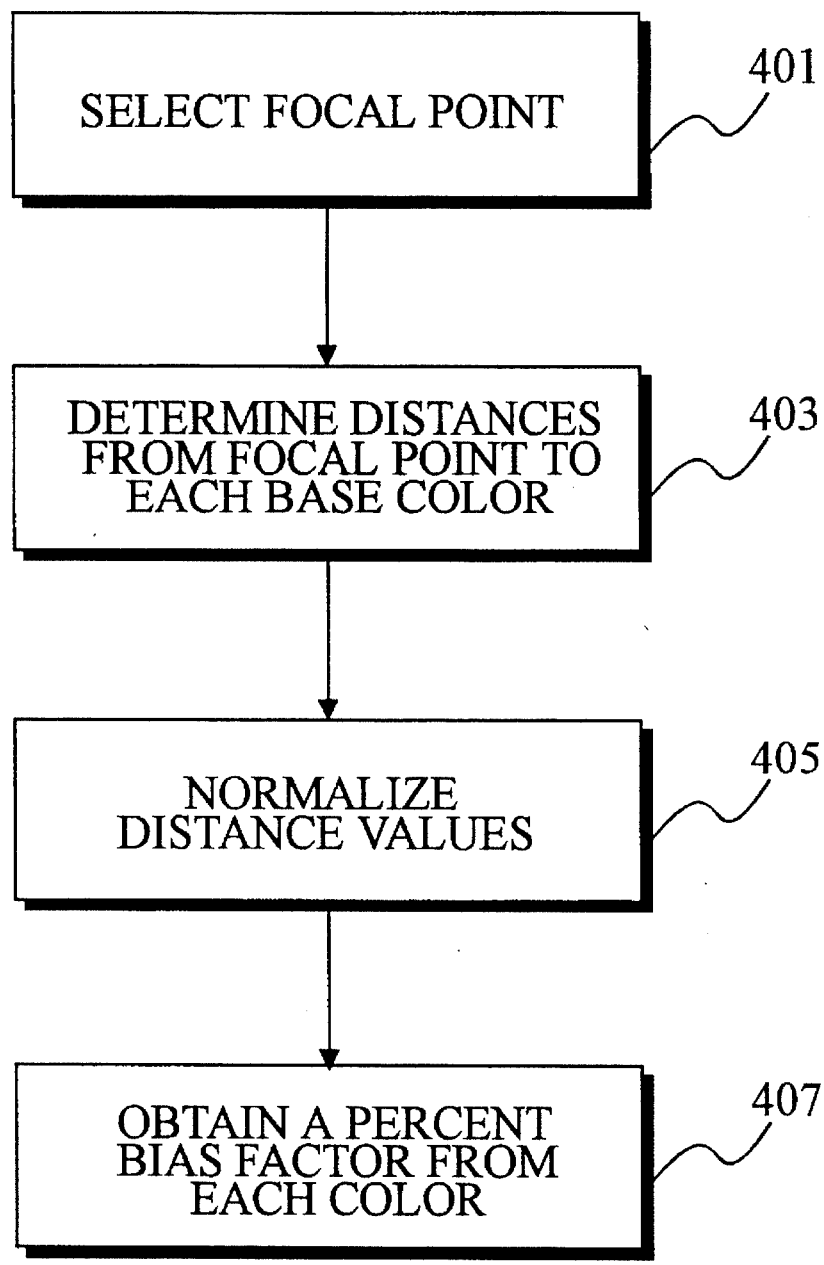
FIG. 4 illustrates the steps for selecting a color bias for the displayed color blend.

Referring to FIG. 4, the steps for selecting a color bias are shown. Bias factors allow an intermediate color within the blend to have an increased range of color values given the same base colors. Bias factors are determined by first having a user select any intermediate color within the blend as a focal point in step 401; the coordinates of this focal point within the established reference frame are then set. The number of potential focal points is equal to the number of colors within the blend. The intermediate color within the blend chosen to be focal point will typically be selected using a mouse-controlled pointer on the display. Once the focal point is selected, relative distances (in pixels) from the focal point to each of the respective base colors is determined in step 403. These relative distances are then normalized in step 405 to obtain a percent bias factor from each one of the base colors in step 407.

For each intermediate color within the blend, relative distances to each one of the respective base colors are then determined in step 211 (see FIG. 2) to calculate (for each intermediate color) percent contributions from each base color. These relative distance values from each intermediate color to each base color are then inverted and multiplied by the corresponding percent bias factors from each base color. As stated above, the bias factors increase the number of potential intermediate color values to the number of colors in the blend. Without bias factors, each intermediate color would be limited to only one color variation, due to blend geometry. Also, if the intermediate color displayed in the center of the applicable geometric display region is selected as the focal point, the percent bias factor from each one of the base colors will be equal, thereby generating a color blend that is equally biased towards each of the selected base colors.

The results of each multiplication step performed above are then normalized to obtain, for each intermediate color, the percent contribution from each base color. For each intermediate color, the percent contribution from each base color is then multiplied by the color value of the corresponding base color. The result of these multiplication operations for each intermediate color are then summed to obtain a color value for each intermediate color.

Figure 5:
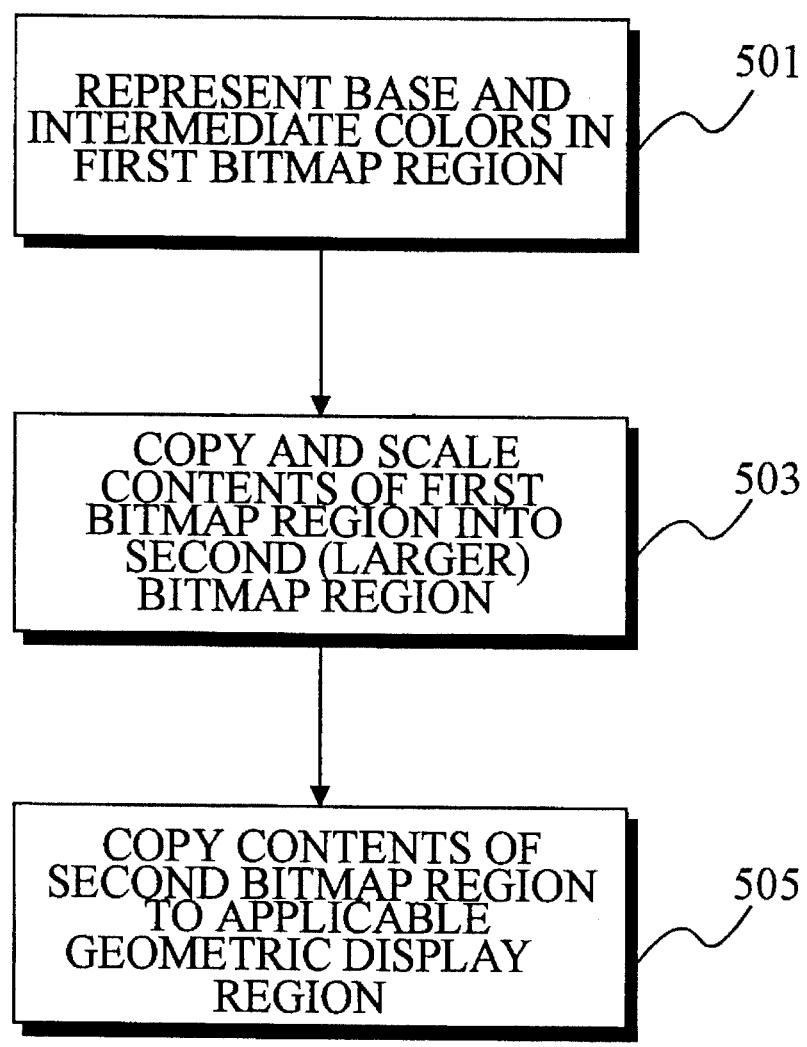
FIG. 5 illustrates the steps for displaying the color blend on a variable visual display.

After generating each intermediate color to be displayed, the resulting blend is then displayed on a variable visual display, such as the video display terminal of a computer in step 213. Referring to FIG. 5, the steps for displaying the resulting color blend are shown. To display the blend, the intermediate colors generated and the selected base colors are first represented in a first rectangular off-screen bit map region which is proportionally smaller (i.e. $1/16$th or similar fraction in preferred embodiment, as stated before) than the applicable geometric display region in step 501. This off-screen area is chosen since drawing to it occurs more quickly than to visible regions. This first off-screen region is created at the maximum allowable bit-depth for the variable visual display being used, thereby enabling the resulting blend to be displayed with as much precision as possible.

Each pixel in the first off-screen bit-map region is then set to a value corresponding to its corresponding base or intermediate color determined previously. Pixels which do not fall within the blend shape are left untouched. This first bit-map region is simultaneously copied and scaled into a second (larger) bit-map region having the same dimensions as the display region in step 503. This second larger bitmap region is also generated off-screen and is maintained at the same bit-depth as the on-screen display region. If the on-screen display region is using a lower bit-depth than the first off-screen bitmap region then dithering is employed to increase the range of colors displayed. If the on-screen display region is set to the same bit-depth as the first off-screen bitmap region, then no dithering is required, and the entire procedure occurs more quickly.

The contents of the second larger bit-map region are then copied onto the applicable on-screen geometric display region in step 505. As noted above, the first and second off-screen bitmap regions are rectangular. If the shape of the blend region is non-rectangular (e.g. an equilateral triangle in the case of a three color blend), a "clipping" region is employed. A "clipping" region is a region created to mask-out certain pixels in another region. Only pixels in both regions are copied in this step.

Several advantages arise from creating two distinct off-screen bitmap regions. First, when the display region is updated, only the second larger off-screen bitmap region needs to be copied to the on-screen display region. The first smaller off-screen bitmap region remains unchanged, as it is unnecessary to recompute the blend in those instances. Secondly, if any any dithering is required, it is performed off-screen. Accordingly, the method is able to perform alterations of an existing blend in real-time. Once the color blend is displayed, any color within the blend can be isolated by user selection and stored for future use in step 215 (see FIG. 2), thereby providing users with a valuable color selection tool.

In order to make and use the present invention, I have found the C++ programming language to be especially useful for programming the aforementioned steps, due to its powerful object-oriented capabilities. I have also found that the Apple Macintosh computer excels at displaying colors according to the method of the present invention, although any equivalent device such as an IBM compatible machine or the like could also be utilized, if desked. In using the Apple Macintosh, the GWorld is the preferred choice for creating the off-screen bit maps of the present invention; however, it will be intuitive to those skilled in the art that an equivalent of this could also be used.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the invention, but that the present invention includes all embodiments falling within the scope of the appended claims.

What is claimed is:

1. A method for displaying blended colors on variable visual display means, comprising the steps of:

selecting, according to a first user input, a plurality of base colors to be blended;

displaying said base colors at edge portions of a geometric display region displayed on said variable visual display means, said geometric display region having a shape determined in dependence upon a number of said base colors selected;

determining a number of intermediate colors to be generated in dependence upon an area of said geometric display region;

generating said intermediate colors in dependence upon relative contributions from each one of said base colors, each one of said relative contributions being based upon a relative distance from a respective one of said intermediate colors to each one of said base colors and further based upon a biasing factor from each one of said base colors; and displaying a resulting blend of said base colors on said variable visual display means, said resulting blend being comprised of said intermediate colors and said base colors positioned within said geometric display region.

2. The method as claimed in claim 1, further comprised of said variable visual display means visually representing said geometric display region as a rectangular bar having two said edge portions when two base colors are chosen to be blended in said selecting step.

3. The method as claimed in claim 1, further comprised of said variable visual display means visually representing said geometric display region as an equilateral triangle when three base colors are chosen to be blended in said selecting step.

4. The method as claimed in claim 1, further comprised of said variable visual display means visually representing said geometric display region as a square when four base colors are chosen to be blended in said selecting step.

5. The method as claimed in claim 1, wherein said number of intermediate colors to be generated is proportional to a number of pixels contained within said geometric display region minus said number of base colors selected.

6. The method as claimed in claim 1, further comprised of generating said biasing factor from each one of said base colors comprising the steps of:

selecting, according to a second user input, one of said intermediate colors within said geometric display region as a focal point;

determining relative distance values from said focal point to each one of said base colors; and normalizing said relative distance values to obtain said biasing factor from each one of said base colors.

7. The method as claimed in claim 1, further comprised of said step of displaying said resulting blend of said base colors comprising the substeps of:

representing said intermediate colors and said base colors in a first bitmap region proportionally smaller than said geometric display region;

copying and scaling contents of said first bitmap region to a second bitmap region larger than said first bitmap region; and copying contents of said second bitmap region to said geometric display region.

8. The method as claimed in claim 7, wherein said second bit-map region uses a bit-depth equal to a bit-depth used by said variable visual display means in displaying said geometric display region.

9. The method as claimed in claim 7, wherein said first and second bit-map regions are maintained in a region not displayed on said variable visual display means.

10. The method as claimed in claim 7, wherein said first bit-map region is created at a maximum bit-depth allowable for said variable visual display means.

11. The method as claimed in claim 1, further comprised of said base colors comprising one of PANTONE colors and random colors.

12. The method for displaying blended colors as claimed in claim 1, further comprising a step of selecting and storing one of said intermediate colors displayed in said resulting blend of said base colors.

13. A system for displaying blended colors, comprising:
input means for providing, according to a user input, selection of a plurality of base colors to be blended;
variable visual display means for displaying said base colors at edge portions of a geometric display region displayed on said variable visual display means, said geometric display region having a shape determined in dependence upon a number of said base colors selected;
processing means for determining a number of intermediate colors to be generated in dependence upon an area of said geometric display region, said processing means generating said intermediate colors in dependence upon relative contributions from each one of said base colors, each one of said relative contributions being based upon a relative distance from a respective one of said intermediate colors to each one of said base colors and further based upon a biasing factor from each one of said base colors; and
said variable visual display means displaying a resulting blend of said base colors, said resulting blend being comprised of said intermediate colors and said base colors positioned within said geometric display region.

14. The system for displaying blended colors as claimed in claim 13, further comprised of said variable visual display means visually representing said geometric region as a rectangular bar having two said edge portions when two base colors are selected to be blended.

15. The system for displaying blended colors as claimed in claim 13, further comprised of said variable visual display means visually representing said geometric region as an equilateral triangle having three said edge portions when three base colors are selected to be blended.

16. The system for displaying blended colors as claimed in claim 13, further comprised of said variable visual display means visually representing said geometric region as a square having four said edge portions when four base colors are selected to be blended.

17. The system for displaying blended colors as claimed in claim 13, further comprised of said base colors comprising PANTONE colors and random colors.

18. A method for displaying blended colors on variable visual display means of a color blend system, said method comprising the steps of:
providing, according to a first user input, electrical signals indicative of a plurality of base colors to be blended;
displaying said base colors at edge portions of a geometric display region displayed on said variable visual display means, said geometric display region having a shape determined in dependence upon a number of said base colors to be blended;
determining a number of intermediate colors to be generated in dependence upon a number of pixels in said geometric display region;
generating said intermediate colors in dependence upon a bias factor associated with each one of said base colors blended; and
displaying a resulting blend of said base colors on said variable visual display means of said color blend system, said resulting blend being comprised of said intermediate colors and said base colors positioned within said geometric display region.

19. The method for displaying blended colors as claimed in claim 18, further comprising a step of generating said bias factor associated with each one of said base colors blended comprising the substeps of:
selecting, according to a second user input, one of said intermediate colors within said geometric display region as a focal point;
determining relative distance values from said focal point to each one of said base colors; and
normalizing said relative distance values to generate said bias factor associated with each one of said base colors blended.

20. The method for displaying blended colors as claimed in claim 19, further comprised of said step of displaying said resulting blend of said base colors comprising the substeps of:
representing said intermediate colors and said base colors in a first bitmap region proportionally smaller than said geometric display region;
copying and scaling contents of said first bitmap region to a second bitmap region larger than said first bitmap region; and
copying contents of said second bitmap region to said geometric display region.

21. The method for displaying blended colors as claimed in claim 18, further comprised of said base colors comprising PANTONE colors and random colors.

22. The method for displaying blended colors as claimed in claim 18, further comprising a step of selecting and storing one of said intermediate colors displayed in said resulting blend of said base colors.

23. A method for displaying blended colors on variable visual display means, comprising the steps of:
selecting, according to a user input, a plurality of base colors to be blended; and
displaying a resulting blend of said base colors within a display region on said variable visual display means, said display region having a shape determined in dependence upon a number of said base colors blended.

24. The method for displaying blended colors as claimed in claim 23, further comprised of said variable visual display means visually representing said display region as a rectangular bar when two base colors are chosen to be blended in said selecting step.

25. The method for displaying blended colors as claimed in claim 23, further comprised of said variable visual display means visually representing said display region as a triangle when three base colors are chosen to be blended in said selecting step.

26. The method for displaying blended colors as claimed in claim 23, further comprised of said variable visual display means visually representing said display region as a square when four base colors are chosen to be blended in said selecting step.

* * * * *